United States Patent
Miedema et al.

(12)

(10) Patent No.: US 10,696,408 B2
(45) Date of Patent: Jun. 30, 2020

(54) DEPLOYABLE TABLE ASSEMBLY

(71) Applicant: Safran Seats GB Limited, Wales (GB)

(72) Inventors: Jurre Miedema, Cwmbran (GB); Paul Wills, Cwmbran (GB); James Woodington, Cwmbran (GB); Andrew Peel, Cwmbran (GB); Mark Douglas, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 0 days.

(21) Appl. No.: 16/110,384

(22) Filed: Aug. 23, 2018

(65) Prior Publication Data

US 2019/0061954 A1 Feb. 28, 2019

(30) Foreign Application Priority Data

Aug. 29, 2017 (GB) .................................. 1713813.2

(51) Int. Cl.
*B64D 11/06* (2006.01)
*A47B 3/00* (2006.01)
(Continued)

(52) U.S. Cl.
CPC ............ *B64D 11/0638* (2014.12); *A47B 3/00* (2013.01); *B60N 3/002* (2013.01); *B60N 3/004* (2013.01);
(Continued)

(58) Field of Classification Search
CPC ... B64D 11/0638; B64D 11/0605; A47B 3/00; A47B 23/043; A47B 21/04; A47B 5/006;
(Continued)

(56) References Cited

U.S. PATENT DOCUMENTS 528,488 A * 10/1894 Paisley
593,935 A * 11/1897 Hall
(Continued)

FOREIGN PATENT DOCUMENTS

CN 201160623 Y 12/2008
CN 102114796 B 7/2012
(Continued)

OTHER PUBLICATIONS

United Kingdom Patent Application No. 1713813.2, Search Report dated Sep. 20, 2018.
(Continued)

*Primary Examiner* — Daniel J Troy
*Assistant Examiner* — Timothy M Ayres
(74) *Attorney, Agent, or Firm* — Kilpatrick Townsend & Stockton LLP; Dean W. Russell

(57) ABSTRACT

The present invention provides a deployable table assembly 10 comprising a deployable table 20, and a support arm 30, the deployable table is moveably mounted to the support arm and moveable between a stowed position 20a and a deployed position 20b, the support arm comprises a coverable region 31 that is covered by the deployable table when the deployable table is in the stowed position, and not covered by the deployable table when the deployable table is in the deployed position, wherein the deployable table assembly further comprises a holder 40 for a personal electronic device mounted at least partially over the coverable region 31 of the support arm. The present invention also provides a deployable table assembly 10 in which the holder 40 is translatably mounted to the support arm 30 and translatable in relation to the support arm from a first translation position to a second translation position.

17 Claims, 9 Drawing Sheets

(51) Int. Cl.
 *B60N 3/00* (2006.01)
 *A47B 23/04* (2006.01)
 *H04M 1/04* (2006.01)
(52) U.S. Cl.
 CPC ........ *B64D 11/0605* (2014.12); *A47B 23/043* (2013.01); *H04M 1/04* (2013.01)
(58) Field of Classification Search
 CPC .... A47B 23/042; A47B 23/044; B60N 3/004; B60N 3/002
 USPC .......................................................... 108/28
 See application file for complete search history.

(56) References Cited

U.S. PATENT DOCUMENTS

| | | | | |
|---|---|---|---|---|
| 1,203,659 A * | 11/1916 | Smith | ................... | A47B 23/043 248/456 |
| 1,483,421 A * | 2/1924 | Farnham | ............... | A47B 23/043 248/453 |
| 1,739,643 A * | 12/1929 | Lowry | ................... | A47B 23/04 108/25 |
| 2,795,473 A * | 6/1957 | Smith | ................... | A47B 23/046 108/147 |
| 3,176,947 A * | 4/1965 | Inverso | ................... | D06F 79/02 248/117.6 |
| 3,475,052 A * | 10/1969 | Kaposi | ................... | A47B 23/02 248/456 |
| 4,043,530 A * | 8/1977 | May | ....................... | A47B 19/10 248/453 |
| 5,092,652 A * | 3/1992 | Macaluso | ............... | A47B 13/16 108/26 |
| 5,370,060 A | 12/1994 | Wang | | |
| 5,516,191 A | 5/1996 | McKee | | |
| 5,839,780 A * | 11/1998 | Cauffiel | ............. | A47B 21/0314 297/135 |
| 6,382,745 B1 * | 5/2002 | Adkins | .................. | B60N 3/002 108/97 |
| 7,073,449 B2 * | 7/2006 | Pipkin | .................... | A47B 23/00 108/25 |
| 7,311,354 B2 * | 12/2007 | Giasson | ................. | B64D 11/06 297/145 |
| 7,455,016 B2 * | 11/2008 | Perin | ....................... | B43L 3/008 108/44 |
| 7,735,644 B2 * | 6/2010 | Sirichai | .................... | A45F 5/02 206/320 |
| 8,474,384 B2 * | 7/2013 | Sundarrao | ................ | A47B 3/00 108/42 |
| 8,887,903 B2 * | 11/2014 | Diebel | ................. | G06F 1/1626 206/45.24 |
| 9,999,296 B1 * | 6/2018 | Fan | ....................... | A47B 23/043 |
| 2005/0178297 A1 | 8/2005 | Pipkin | | |
| 2007/0283855 A1 * | 12/2007 | Pozzi | .................... | A47B 23/043 108/44 |
| 2010/0038514 A1 * | 2/2010 | Yu | ........................ | A47B 23/044 248/449 |
| 2014/0116299 A1 * | 5/2014 | Salehi | ..................... | A47B 41/06 108/32 |
| 2015/0068434 A1 | 3/2015 | Pajic | | |
| 2015/0108798 A1 * | 4/2015 | Boyer, Jr. | .......... | B64D 11/0638 297/163 |
| 2016/0286953 A1 * | 10/2016 | Castro | .................... | A47B 23/04 |

FOREIGN PATENT DOCUMENTS

| | | |
|---|---|---|
| CN | 202966025 U | 6/2013 |
| CN | 204378352 U | 6/2015 |
| DE | 4343242 A1 | 6/1995 |
| FR | 2911548 A1 | 7/2008 |
| FR | 3011783 A1 | 4/2015 |
| WO | 2012129116 A2 | 9/2012 |
| WO | 2017048319 | 3/2017 |

OTHER PUBLICATIONS

Europe Patent Application No. 18191122.3, Extended Search Report dated Nov. 30, 2018, 8 pages.

* cited by examiner

DEPLOYABLE TABLE ASSEMBLY

CROSS-REFERENCE TO RELATED APPLICATIONS

This application claims the benefit of and priority to United Kingdom Patent Application No. 1713813.2, filed Aug. 29, 2017, and entitled "Deployable Table Assembly," the entire contents of which are incorporated herein by this reference.

BACKGROUND OF THE INVENTION

The present disclosure relates to deployable table assemblies.

The present invention concerns a deployable table assembly. More particularly, but not exclusively, this invention concerns a deployable table assembly comprising a holder for a personal electronic device, such as a mobile phone, tablet or pad.

There are many holders available for holding personal electronic devices. Generally speaking these are designed to be used on their own and are free-standing. An example is a cushioned tablet holder that may be placed on a table or on a user's lap, and holds the tablet in an angled position for use, especially for viewing.

However, these examples are not suitable for, for example, being provided by an airline for an aircraft passenger. Such a holder would be likely to become separated form an associated seat over time and is not integrated with the seat unit, for example.

The present invention seeks to mitigate the above-mentioned problems. Alternatively or additionally, the present invention seeks to provide an improved deployable table assembly.

SUMMARY OF THE INVENTION

The present invention provides, according to a first aspect, a deployable table assembly comprising a deployable table, and a support arm, wherein the deployable table is moveably mounted to the support arm and is moveable in relation to the support arm between a stowed position and a deployed position, wherein the support arm comprises a coverable region that is covered by the deployable table when the deployable table is in the stowed position, and not covered by the deployable table (exposed by the deployable table) when the deployable table is in the deployed position, wherein the deployable table assembly further comprises a holder for a personal electronic device mounted at least partially over the coverable region of the support arm such that the holder is at least partially covered by the deployable table element when the deployable table is in the stowed position, and at least partially exposed when the deployable table is in the deployed position.

This assembly has the advantage that the holder is integral with the assembly, including the table and support arm. This prevents it from becoming separated from the other items of the assembly. In addition, the support arm used to support the deployable table is also used to support the holder. Hence, no separate support arm is required for the holder. These advantages are especially useful when the assembly is mounted as part of an aircraft, for example as part of an aircraft seat unit, for use by an aircraft passenger.

Furthermore, having the holder mounted over the coverable region of the support arm means that the holder is only exposed for use when the table is deployed. This prevents damage to the holder as it is protected when the table is stowed. This also provides for a neater, cleaner, uncluttered look of the assembly when the table is stowed. These advantages are especially useful when the assembly is mounted as part of an aircraft, for example as part of an aircraft seat unit, for use by an aircraft passenger.

It is also noted that such an assembly has the advantage that the stowage of the holder makes use of unused space under the table. Again, this is especially useful when the assembly is mounted as part of an aircraft, for example as part of an aircraft seat unit, for use by an aircraft passenger.

Preferably, the holder is mounted to the coverable region of the support arm. Preferably, the holder is the holder is mounted fully over the coverable region of the support arm. In other words, preferably, the holder is fully covered by the deployable table element when the deployable table is in the stowed position, and fully exposed when the deployable table is in the deployed position.

Preferably, movement of the deployable table between the stowed and deployed positions is a movement within the plane of the deployable table. This provides a compact deployment arrangement.

More preferably, the movement of the deployable table is by rotating or sliding. Even more preferably, the movement is by rotating.

Alternatively, the movement of the deployable table is by folding and unfolding.

Preferably, the deployable table may be moved towards a user when moving from the stowed position to the deployed position (so that more table area is nearer the user) and wherein the coverable region of the arm, as viewed by the user, is behind the deployed position of the deployable table. This means that access to the table (and any objects on it) is not obstructed by the holder or any electronic device being held by it. This means that an aircraft passenger could use the table for eating a meal, whilst still being able to view the electronic device, to watch a film, for example. The movement of the table towards the user may be provided by a telescoping action. The telescoping action may be provided by the support arm being telescopic. For example, the support arm may comprise a support rail and a slidable arm portion, the slidable arm portion being slidably mounted on the support rail.

Preferably, the holder comprises a pivotable arm that is rotatably mounted by a first end to the support arm and wherein a second, opposite end of the pivotable arm provides a first support surface for the electronic device. This provides a simple, intuitive operation of the holder that does not interfere with the table.

The first support surface may comprise a high friction material to prevent sliding of the electronic device on the first support surface. The first support surface may comprise a malleable material to allow the electronic device to be supported by a surface moulded to its angle/shape. The arm may have a width of between 2 cm and 30 cm to allow for the electronic device to be held and prevented from wobbling on the pivotable arm.

More preferably, the pivotable arm is rotatable between a stowed position, preferably where the pivotable arm is substantially or completely flush with the support arm, and at least one deployed position, where the pivotable arm projects at an angle from the support arm. This allows for the holder to be effectively stowed flush against the support arm (and hence, not prevent the table from moving back to its stowed position) but also allows the holder to be easily deployed.

Preferably, the deployable table assembly comprises a table locking mechanism that prevents the table from moving towards the stowed position when the pivotable arm is not in the stowed position. This prevents the table from damaging the holder (or any electronic device being held by it) which may otherwise occur by it being stowed whilst the holder is deployed.

Preferably, there is also provided a second support surface for the electronic device. This allows the electronic device to be held by two supports; the combination of supports preventing it sliding forwards and maintaining an appropriate angle for viewing.

The second support surface may comprise a high friction material to prevent sliding of the electronic device on the second support surface. The second support surface may comprise a malleable material to allow the electronic device to be supported by a surface moulded to its angle/shape. The second support surface may comprise an edge of the deployed table.

More preferably, the second support surface is provided by a retaining edge mounted on the support arm. This provides an actual edge for the electronic device to abut against, which helps to prevent sliding forwards.

More preferably, there are a plurality of retaining edges mounted on the support arm at different positions along the support arm. This allows for a number of different positions, especially angle positions, of the holder (and any electronic device being held by it).

The pivotable arm may be able to provide many angle positions from its stowed position of 0 degrees (preferably substantially or completely flush against the support arm) to a fully deployed position of, for example, 60 degrees or 120 degrees angled backwards from the support arm. Each angle position may be maintained by the pivotable arm being mounted by a friction hinge to the support arm.

Preferably, the holder is translatably mounted to the support arm and translatable in relation to the support arm from a first translation position to a second translation position. This assembly also has the advantage that the holder (and therefore the electronic device being held by the holder) is able to move, preferably laterally or alternatively or additionally forwards and backwards, in relation to the support arm. When considering the lateral movement, this allows for different devices, of different widths, to be centred with respect to the user. This is especially useful if the deployed table is not centred (i.e. is "off-centre") with respect to the support arm.

According to a second aspect of the invention there is also provided a deployable table assembly comprising a deployable table, and a support arm, wherein the deployable table is moveably mounted to the support arm and is moveable in relation to the support arm between a stowed position and a deployed position, wherein the deployable table assembly further comprises a holder for a personal electronic device mounted to the support arm, wherein the holder is translatably mounted to the support arm and translatable in relation to the support arm from a first translation position to a second translation position.

This assembly has the advantage that the holder is integral with the assembly, including the table and support arm. This prevents it from becoming separated from the other items of the assembly. In addition, the support arm used to support the deployable table is also used to support the holder. Hence, no separate support arm is required for the holder. These advantages are especially useful when the assembly is mounted as part of an aircraft, for example as part of an aircraft seat unit, for use by an aircraft passenger.

This assembly also has the advantage that the holder (and therefore the electronic device being held by the holder) is able to move, laterally or forwards and backwards, in relation to the support arm. When considering the lateral movement, this allows for different devices, of different widths, to be centred with respect to the user. This is especially useful if the deployed table is not centred (i.e. is "off-centre") with respect to the support arm.

Preferably, the holder is slidably mounted to the support arm.

More preferably, the holder is slidable laterally in relation to the support arm.

Preferably, the holder comprises a pivotable arm that is rotatably mounted by a first end to the support arm and wherein a second, opposite end of the pivotable arm provides a first support surface for the electronic device. This provides a simple, intuitive operation of the holder that does not interfere with the table.

The first support surface may comprise a high friction material to prevent sliding of the electronic device on the first support surface. The first support surface may comprise a malleable material to allow the electronic device to be supported by a surface moulded to its angle/shape. The arm may have a width of between 2 cm and 30 cm to allow for the electronic device to be held and prevented from wobbling on the pivotable arm.

More preferably, the pivotable arm is rotatable between a stowed position, preferably where the pivotable arm is substantially or completely flush with the support arm, and at least one deployed position, where the pivotable arm projects at an angle from the support arm. This allows for the holder to be effectively stowed flush against the support arm (and hence, not prevent the table from moving back to its stowed position) but also allows the holder to be easily deployed.

Even more preferably, the deployable table assembly comprises a holder locking mechanism that prevents the holder from moving towards the second translation position when the pivotable arm is in the stowed position. This prevents the holder being needlessly moved (and potentially damaged) when not being used.

Preferably, the deployable table assembly comprises a table locking mechanism that prevents the table from moving towards the stowed position when the pivotable arm is not in the stowed position. This prevents the table from damaging the holder (or any electronic device being held by it) by being stowed whilst the holder is deployed.

Preferably, there is also provided a second support surface for the electronic device. This allows the electronic device to be held by two supports; the combination of supports preventing it sliding forwards, and maintaining an appropriate angle for viewing.

The second support surface may comprise a high friction material to prevent sliding of the electronic device on the second support surface. The second support surface may comprise a malleable material to allow the electronic device to be supported by a surface moulded to its angle/shape. The second support surface may comprise an edge of the deployed table.

More preferably, the second support surface is provided by a retaining edge mounted on the support arm. This provides an actual edge for the electronic device to abut against, which helps to prevent sliding forwards.

More preferably, there are a plurality of retaining edges mounted on the support arm at different positions along the support arm. This allows for a number of different positions, especially angle positions, of the holder (and any electronic device being held by it).

The pivotable arm may be able to provide many angle positions from its stowed position of 0 degrees (preferably substantially or completely flush against the support arm) to a fully deployed position of, for example, 60 degrees or 120 degrees angled backwards from the support arm. Each angle position may be maintained by the pivotable arm being mounted by a friction hinge to the support arm.

Even more preferably, the one or more retaining edges are mounted so as to move translatably with the holder. This allows the electronic device, whilst being fully supported by two supports, to be moved translatably.

Preferably, the support arm comprises a coverable region that is covered by the deployable table when the deployable table is in the stowed position, and not covered by the deployable table when the deployable table is in the deployed position, and wherein the holder is mounted at least partially over the coverable region of the support arm such that the holder is at least partially covered by the deployable table element when the deployable table is in the stowed position, and at least partially exposed when the deployable table is in the deployed position. Having the holder mounted to the coverable region of the support arm means that the holder is only exposed for use when the table is deployed. This prevent damage to the holder as it is protected when the table is stowed. This also provides for a neater, cleaner, uncluttered look of the assembly when the table is stowed. These advantages are especially useful when the assembly is mounted as part of an aircraft, for example as part of an aircraft seat unit, for use by an aircraft passenger. It is also noted that such an assembly has the advantage that the stowage of the holder makes use of unused space under the table. Again, this is especially useful when the assembly is mounted as part of an aircraft, for example as part of an aircraft seat unit, for use by an aircraft passenger.

Preferably, the holder is mounted to the coverable region of the support arm. Preferably, the holder is the holder is mounted fully over the coverable region of the support arm. In other words, preferably, the holder is fully covered by the deployable table element when the deployable table is in the stowed position, and fully exposed when the deployable table is in the deployed position.

Preferably, the deployable table assembly of either aspect is suitable for mounting to an aircraft interior structure, such as the back of a passenger seat or a console unit, for use by a passenger behind.

It will of course be appreciated that features described in relation to one aspect of the present invention may be incorporated into other aspects of the present invention. For example, the first aspect of the invention may incorporate any of the features described with reference to the second aspect of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
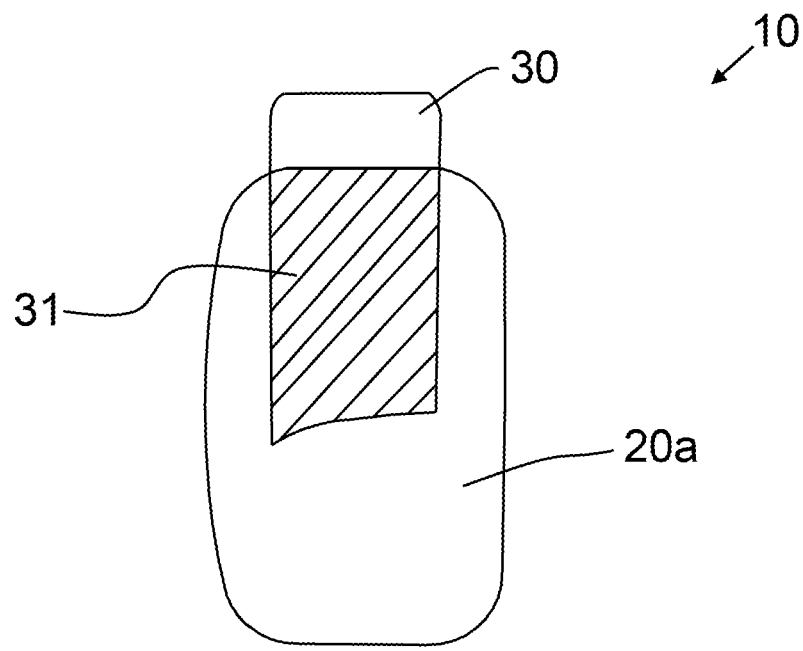
FIG. 1a shows a plan view of a deployable table assembly according to a first embodiment of the invention, in a "stowed table" configuration.

FIG. 1a shows a plan view of a deployable table assembly 10 according to a first embodiment of the invention, in a "stowed table" configuration.

Here it can be seen that the table 20 is in a stowed position 20a. It is supported underneath by a support arm 30. The table is mounted so as to be rotatable on the support arm. The support arm 30 can be mounted on a structure (not shown).

Figure 1B:
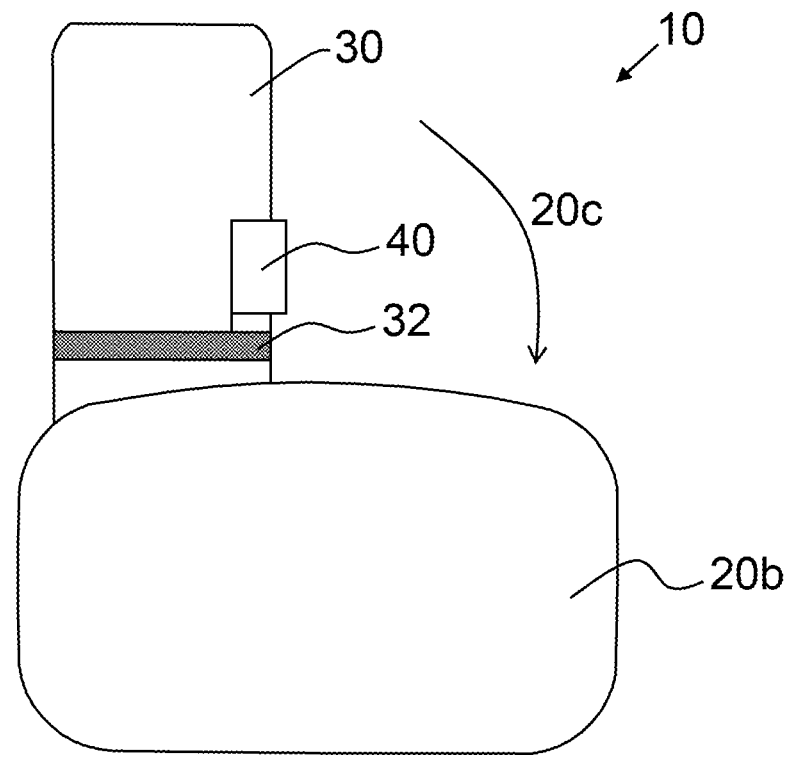
FIG. 1b shows a plan view of the deployable table assembly of FIG. 1a, in a "deployed table" configuration.

FIG. 1b shows a plan view of the deployable table assembly 10 of FIG. 1a, in a "deployed table" configuration.

Here it can be seen that the table 20 has been rotated with respect to the support arm 30 (shown by arrow 20c) to a deployed position 20b. The table 20 has moved from a "portrait" orientation to a "landscape" orientation. This movement exposes a region 31 of the support arm that is shown in hatched lines in FIG. 1a. This region is covered by the table in the stowed position and not covered (exposed) by the table when then table is in the deployed position.

In this region 31 is a holder 40 for holding a personal electronic device of a user of the table 20. The holder comprises a pivotable arm 41 with a width, extending across the support arm, of 10 cm. This pivotable arm 41 will be described in more detail later. Also, in the region 31 is a retaining edge region 32. Again, this will be described in more detail later.

Figure 2A:
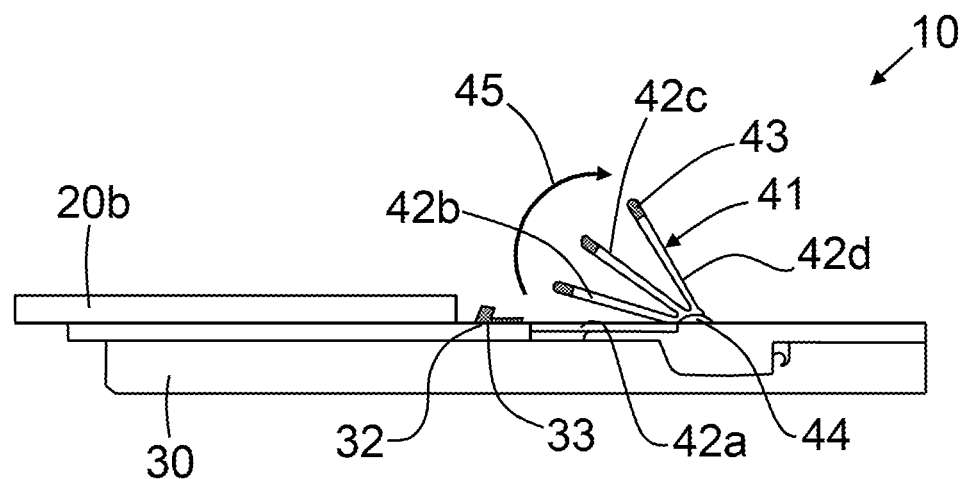
FIG. 2a shows a side view of the deployable table assembly of FIGS. 1a and 1b, in a "deployed table" configuration and also showing the pivotable arm in a variety of positions.

FIG. 2a shows a side view of the deployable table assembly of FIGS. 1a and 1b, in a "deployed table" configuration and also showing the pivotable arm 41 in a variety of positions. As can be seen, the pivotable arm 41 sits flush so as to not protrude above the upper surface of the support arm 30 when it is in its stowed position (designated as 42a). It can then be pivoted (shown by arrow 45) from its first end at a friction hinge 44 into a variety of other angles from the support arm 30. Here, three other positions 42b (at approximately 20 degrees), 42c (at approximately 45 degrees) and 42d (at approximately 70 degrees) are shown. The arm 41 may be pivoted even further as far as an angle of 120 degrees from the front support arm surface. At the second, distal end of the pivotable arm 41 is a rubber tip 43, which acts as a support surface for an electronic device on the holder 40. The angle of a supported electronic device can be adjusted by altering the angle of the pivotable arm 41.

Also, in FIG. 2a the retaining region 32 in front of the pivotable arm 41 can be seen more clearly. Here is can be seen that it comprises a retaining lip 33 that protrudes up from the surface of the support arm 30. It is also angled backwards towards the pivotable arm 41. This acts as a second support surface for an electronic device on the holder 40. The retaining lip 33 is made of a rubber material.

Figure 2B:
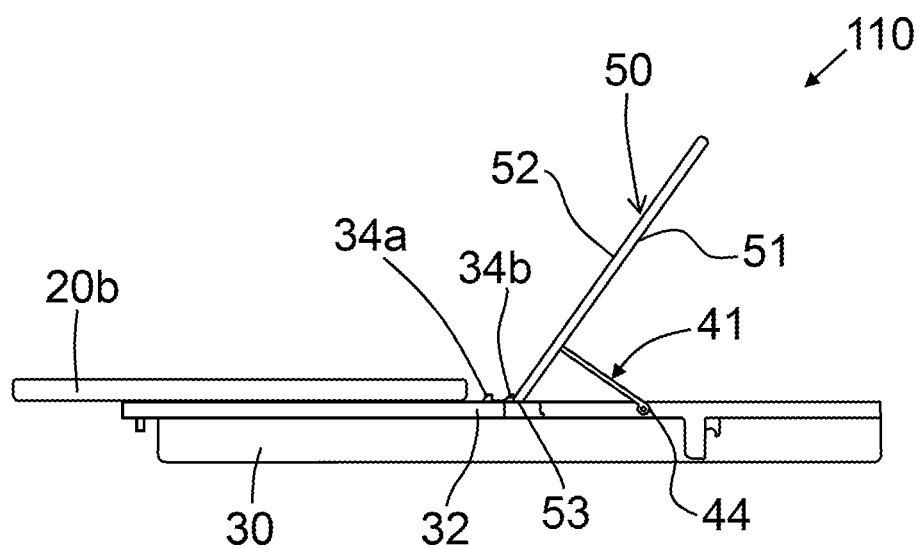
FIG. 2b shows a side view of a deployable table assembly according to a second embodiment of the invention, in a "deployed table" configuration, also showing the pivotable arm in a deployed position and also showing a personal electronic device on the pivotable arm.

FIG. 2b shows a side view of a deployable table assembly 110 according to a second embodiment of the invention, in a "deployed table" configuration, also showing the pivotable arm 41 in a deployed position and also showing a personal electronic device 50 on the pivotable arm 41. This second embodiment is very similar to the first embodiment and the same reference numerals will be used for like elements. Where elements have not been described, it can be assumed they are the same as, or substantially similar to, before.

Here, the retaining region 32 comprises two lips 34a, 34b, each of them very similar to lip 33. They are spaced apart along the length of the support arm 30 so that different height personal electronic devices can be supported in two different locations and at different angles.

The electronic device 50 comprises a front viewing surface 52, a back surface 51 and a bottom edge 53. It can be seen that the bottom edge 53 abuts against one of the retaining lips 34b and is so prevented from slipping forwards. The back surface 51 of the device 50 rests on the deployed pivotable arm 41. Hence, the device 50 is held at the required angle by the holder 40.

Figure 2C:
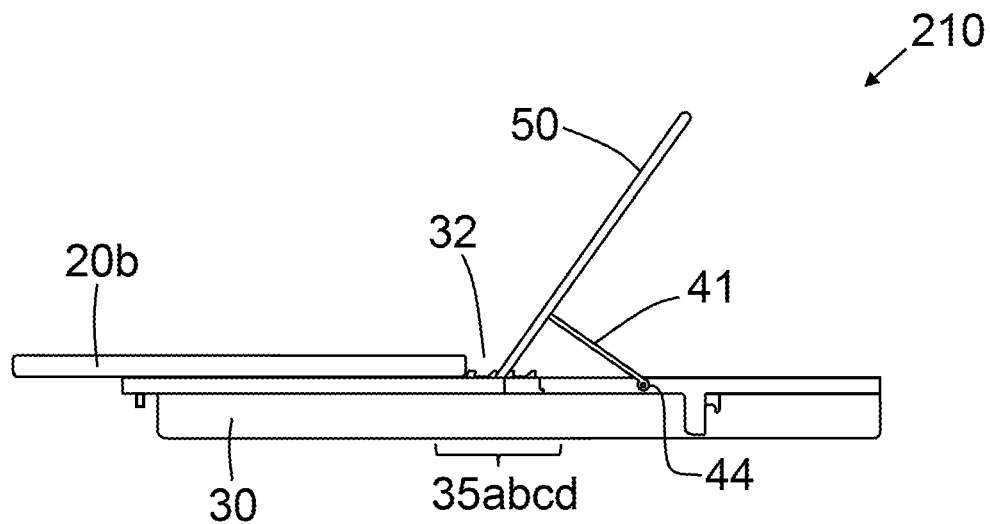
FIG. 2c shows a side view of a deployable table assembly according to a third embodiment of the invention, in a "deployed table" configuration, also showing the pivotable arm in a deployed position and also showing a personal electronic device on the pivotable arm.

FIG. 2c shows a side view of a deployable table assembly 210 according to a third embodiment of the invention, in a "deployed table" configuration, also showing the pivotable arm 41 in a deployed position and also showing a personal electronic device 50 on the pivotable arm 41. This third embodiment is very similar to the first and second embodiments and the same reference numerals will be used for like elements. Where elements have not been described, it can be assumed they are the same as, or substantially similar to, before.

Here, the retaining region 32 comprises four lips 35a, 35b, 35c and 35d, each of them very similar to lip 33 or lips 34a and 34b. They are spaced apart along the length of the support arm 30 so that different height personal electronic devices can be supported in four different locations and at different angles.

Figure 2D:
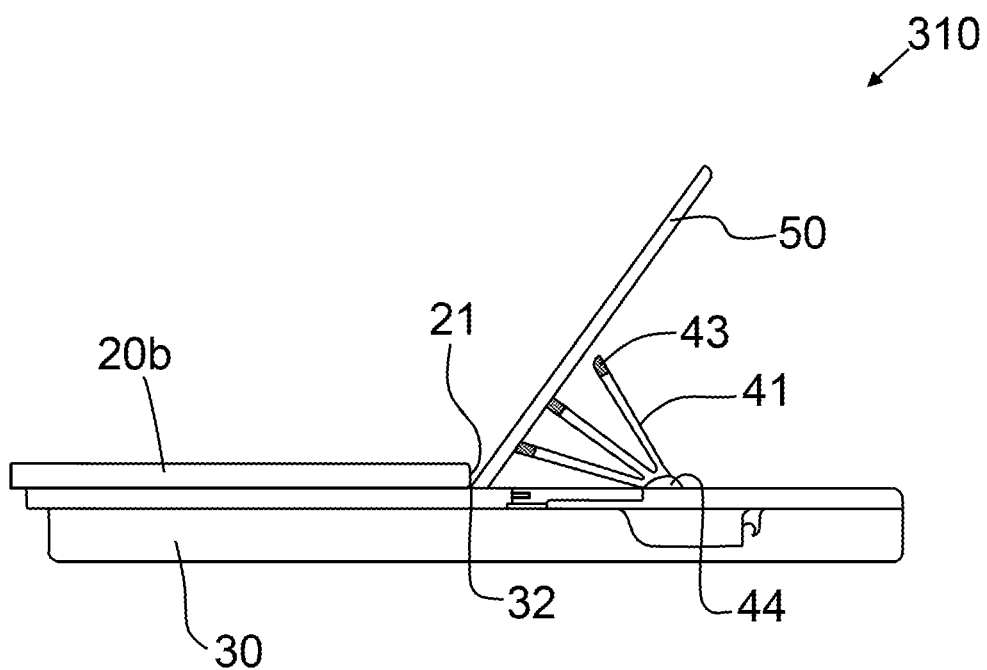
FIG. 2d shows a side view of a deployable table assembly according to a fourth embodiment of the invention, in a "deployed table" configuration, also showing the pivotable arm in a variety of positions and also showing a personal electronic device on the pivotable arm.

FIG. 2d shows a side view of a deployable table assembly 310 according to a fourth embodiment of the invention, in a "deployed table" configuration, also showing the pivotable arm 41 in a variety of positions and also showing a personal electronic device 50 on the pivotable arm 41. This fourth embodiment is very similar to the first, second and third embodiments and the same reference numerals will be used for like elements. Where elements have not been described, it can be assumed they are the same as, or substantially similar to, before.

Here, there is no specific elements to the retaining region 32. Instead, the electronic device 50 is simply able to abut against a back edge 21 of the table 20. Hence, the back edge 21 of the table 20 acts as a retaining lip.

This Figure also shown that the rubber tip 43 of the pivotable arm 41 is squash-able/malleable so as to "mould" to the angle of the electronic device 50 resting on it.

Figure 3:
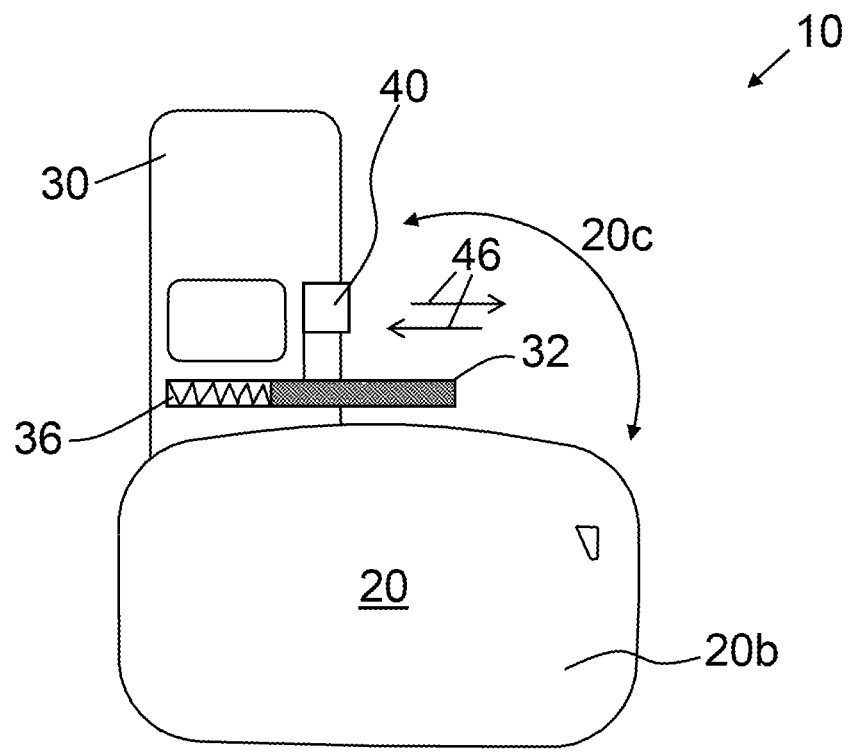
FIG. 3 shows a plan view the deployable table assembly of FIGS. 1a and 1b, in a "deployed table" configuration and also showing the lateral movement of the pivotable arm and retaining edge region.

FIG. 3 shows a plan view the deployable table assembly 10 of FIGS. 1a and 1b, in a "deployed table" configuration and also showing the lateral movement of the pivotable arm 41 and retaining edge region 32.

When the table 20 is in the deployed position 20b, the pivotable arm 41 can be pulled in and out laterally (shown by arrows 46) so as to centre the holder 40 (and electronic device 50) with respect to the table 20 or user. It is noted that the retaining region 32 also moves at the same time as the pivotable arm 41 (by use of a mechanical linkage, not shown). A spring 36 acts to hold the pivotable arm 41 and retaining region 32 in the required place.

Figure 4:
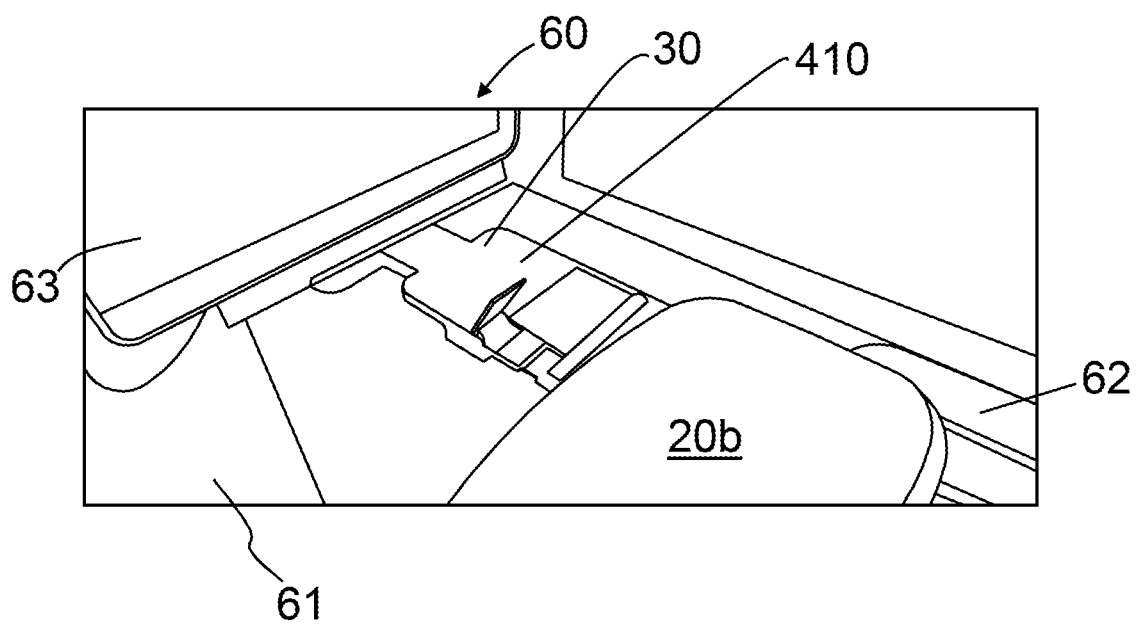
FIG. 4 shows a perspective view of a deployable table assembly according to a fifth embodiment of the invention, showing the assembly in situ as part of an aircraft seat unit, mounted to a seat console and useable by a passenger in the seat behind.
Figure 3A:
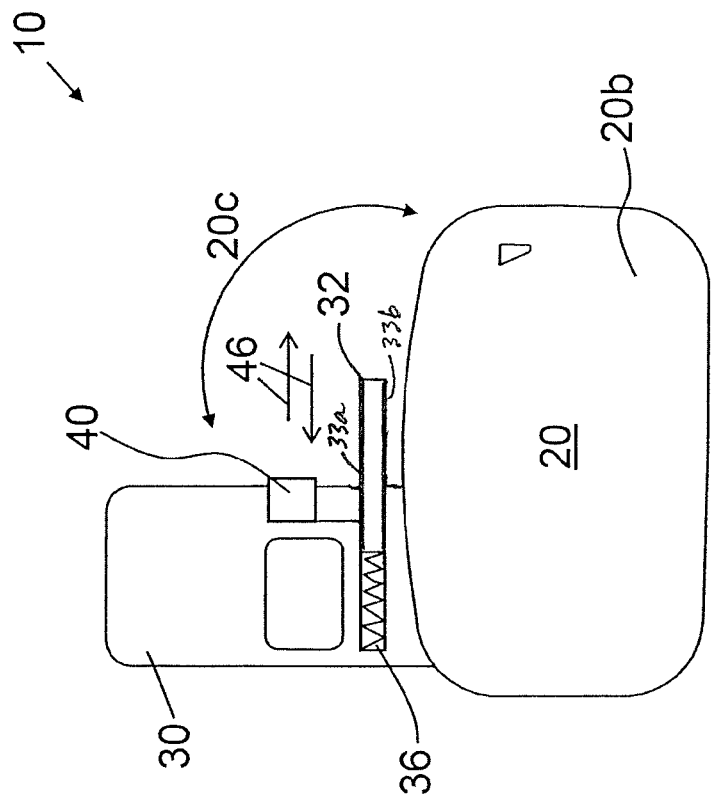
FIG. 3A shows a plan view of the deployable table assembly of FIG. 3 with a plurality of retaining edges (lips 33a, 33b) similar to those shown in FIG. 2b.

FIG. 4 shows a perspective view of a deployable table assembly 410 according to a fifth embodiment of the invention, showing the assembly in situ as part of an aircraft seat unit 60, mounted to a seat console 61 and useable by a passenger in the seat behind 62. The support arm 30 is mounted to the seat console 61 under a TV monitor 63. This console is in front of the passenger seat 62 so the passenger in seat 62 can use the table 20 and holder 40. The console is located above a footwell for the passenger.

Figure 5:
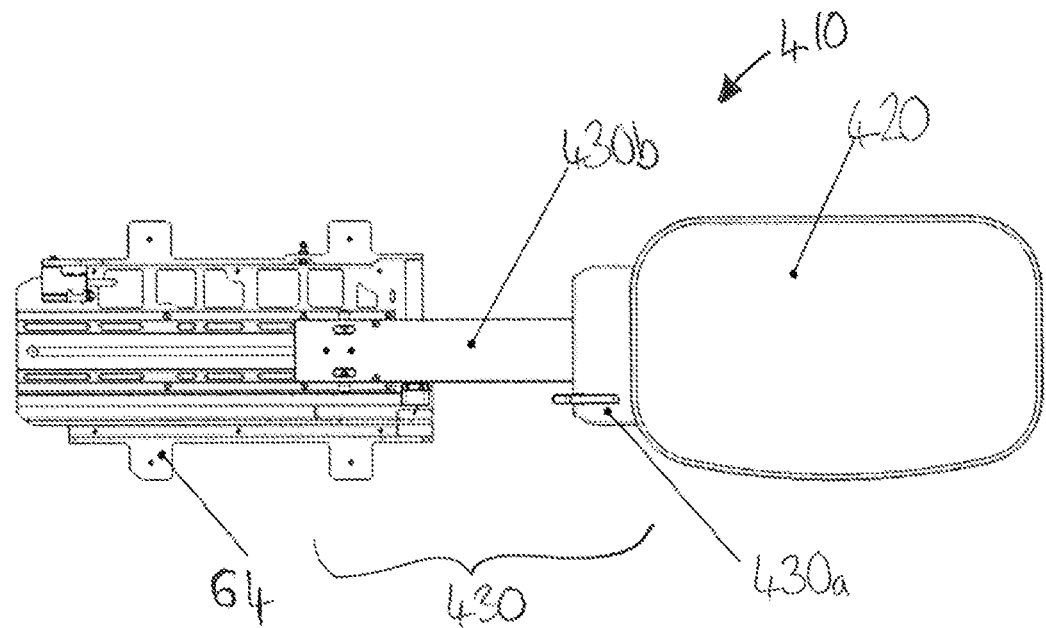
FIG. 5 shows a plan view of the deployable table assembly of FIG. 4, showing the telescoped nature of the support arm.

FIG. 5 shows a plan view of the deployable table assembly 410. Here, it can be seen that the support arm 430 comprises a support arm portion 430a and a rail 430b. The support arm portion 430a is slidably mounted to the rail 430b. The rail 430b is slidably mounted to a mounting plate 64 that is mounted in the seat console 61. Hence, the support arm 430 is able to slide out in a telescopic manner.

Figure 6:
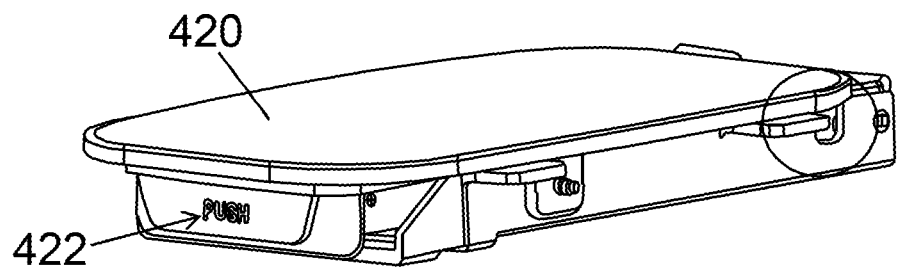
FIG. 6 shows a perspective view of the deployable table assembly of the fifth embodiment, in a "stowed table" configuration.
Figure 7:
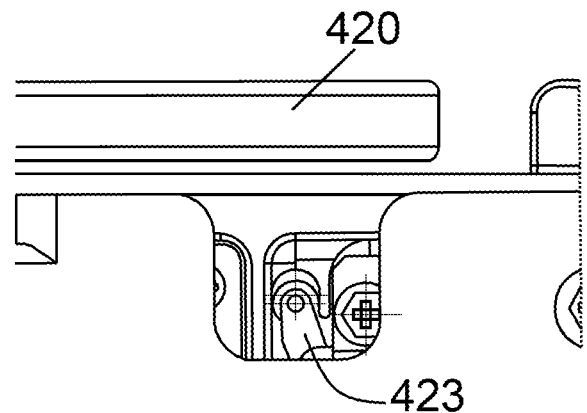
FIG. 7 shows an enlarged side view of the circled area in FIG. 6, showing a release latch.

FIG. 6 shows a perspective view of the deployable table assembly 410, in a "stowed table" configuration. The table 420 has a latch button 422 at the front that a passenger can press to release a latch 423 and enable the table to be deployed. The latch is located in the circled area of FIG. 6 and is shown enlarged in FIG. 7. This latch 423 is released by the action of the pressing on the latch button 422. Once de-latched, the table can be pulled forwards so that the table 420, support arm portion 430a and rail 430b are slid in relation to the mounting plate 64.

Figure 8:
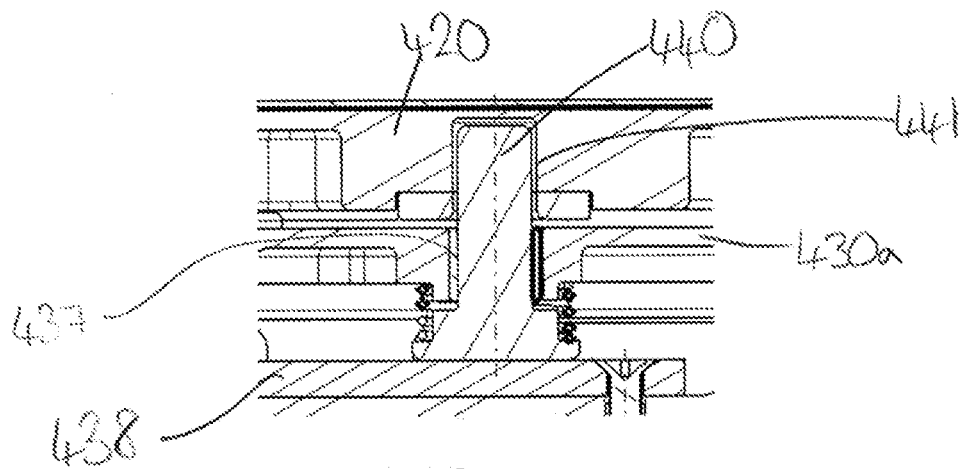
FIG. 8 shows an enlarged cross-sectional side view of the deployable table assembly of the fifth embodiment, in the "stowed table" configuration, showing a retaining pin.

FIG. 8 shows an enlarged cross-sectional side view of the deployable table assembly 410, in the "stowed table" configuration, showing a retaining pin 440. This pin 440 forms part of the support arm portion 430a and acts to retaining the table leaf 420 in relation to the support arm portion 430a. This is done by the retaining pin 440 extending through a through hole 437 in the support arm portion 430a into a closed hole 441 on the underside of the table leaf and thus, preventing the table leaf 420 from being rotated in relation to the support arm portion 430a. The pin 440 extends upwards from a sliding lock arm 438 of the support arm portion 430a. The height of the sliding lock arm 438 in relation to the hole 437 varies, as the sliding lock arm can move up and down, depending on the orientation of the table 420, as will be described in more detail later.

Figure 9:
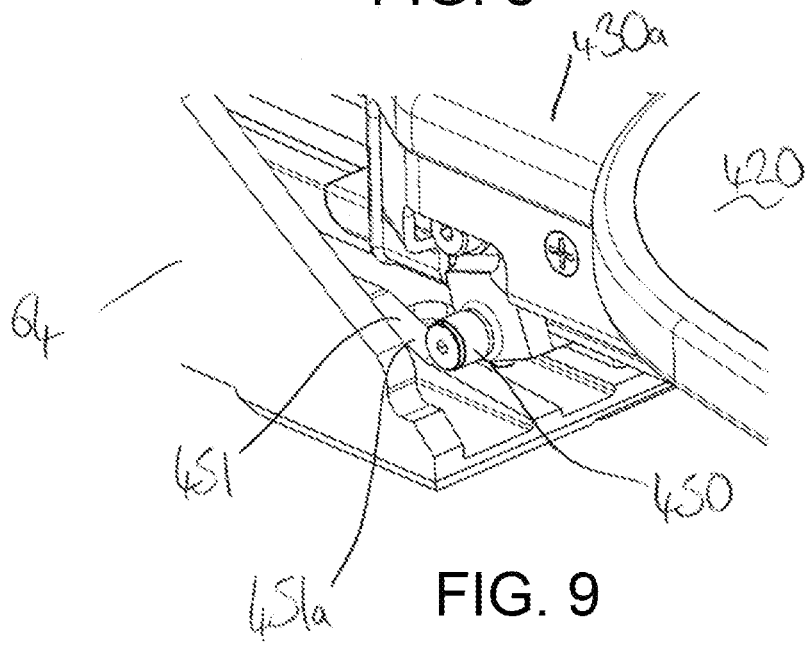
FIG. 9 shows an enlarged perspective view of a cam follower and cam track used in the deployment of the table of the fifth embodiment.
Figure 10:
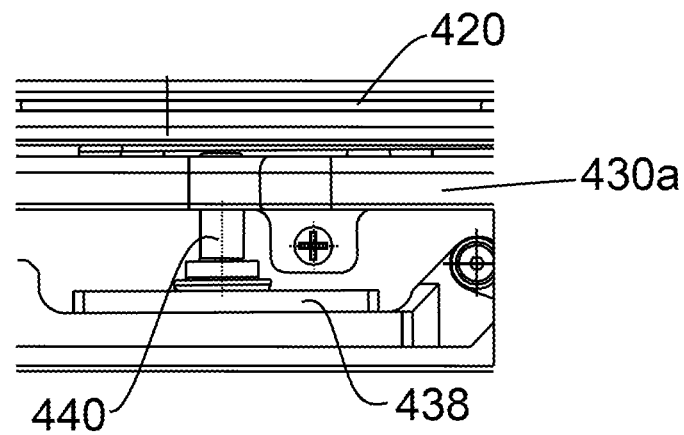
FIG. 10 shows an enlarged side view of the deployable table assembly of the fifth embodiment, in a "partly deployed" configuration, showing the retaining pin.

FIG. 9 shows an enlarged perspective view of a cam follower 450 and cam track 451 used in the deployment of the table 420. The cam follower 450 is connected to the support arm portion 430a. When the table leaf 420 is pulled forwards, the support arm portion 430a moves in relation to the mounting plate 64. This causes the cam follower 450 to run along the cam track 451 that is located on the mounting plate 64. The cam track 451 is "stepped" so that the cam follower 450 travelling along it moves downwards at a first step 451a. The cam follower 450 is connected to the retaining pin 440 and so the downwards movement of the cam follower 450 causes the retaining pin 440 to drop. This means that the retaining pin 440 drops out of the hole 441 in the table 420 and thus allows the table 420 to be able to be rotated in relation to the support arm portion 430a. This dropped position of the retaining pin 440 is shown in FIG. 10.

It is noted that the dropping of the pin 440 corresponds to the cam follower 450 reaching a certain position (the first step 451a) on the cam track 451. This corresponds to the table 420, support arm portion 430a and rail 430b being pulled forwards by a distance of approximately 440 mm. At this distance, rotation of the table leaf 420 does not cause abutting or knocking into any of the console furniture etc. As the table 420 is rotated, it rotates in relation to the pin 440. The profile of the underside of the table 420 is shaped (i.e. has a depth that varies) so that as the table 420 rotates in relation to the retaining pin 440, the pin 440 is pushed downwards. Therefore, between the angles of 45 and 90 degrees, the pin 440 is being pushed downwards by the table 420.

Figure 11:
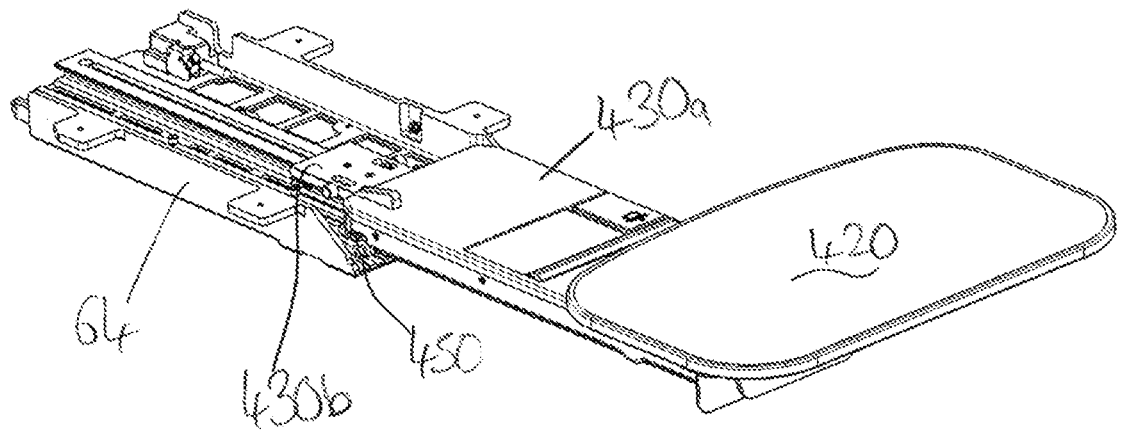
FIG. 11 shows a perspective view of the deployable table assembly of the fifth embodiment, in the "rotated" configuration.

FIG. 11 shows a perspective view of the deployable table assembly 410, in this rotated (to 90 degrees) configuration.

With the table 420 rotated between 45 degrees and 90 degrees, the retaining pin 440 push up against the underside of the table 420 if the table 420 was attempted to be stowed. Hence, the cam follower 450 would not be able to go back up the cam track 451. Hence, stowage of the table 420 is prevented when it is rotated past 45 degrees.

The table 420 can be pulled further forwards from the configuration in FIG. 11, and this causes the support arm portion 430a to slide in relation to the rail 430b. In the fully deployed position, the table 420 is very close to the passenger in the seat, at a total distance away from the console of approximately 650 mm (i.e. a further 210 mm).

Figure 12:
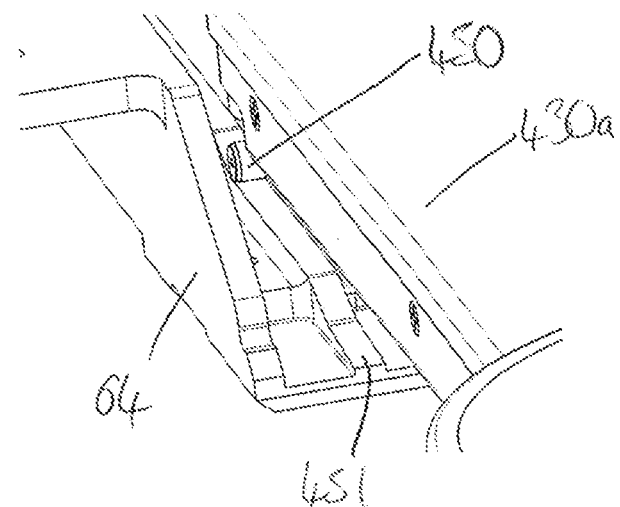
FIG. 12 shows an enlarged perspective view of the cam follower and cam track of FIG. 9, used to allow movement of the table but not rotation of the table.

If a passenger then wants to exit their seat without having to rotate the table 420 back to its original orientation, the passenger can push against the table 420. This causes the rail 430b and support arm portion 430a to both be pushed towards the mounting plate 64. This provides for an extra approximately 82.5 mm of space (i.e. a total distance of 567.5 mm). At the end of this travel, the cam follower 450 has stepped up on the cam track 451, as shown in FIG. 12.

During this travel, the retaining pin 440 is located in a different hole 442 in the underside of the table leaf 420 and so rotation of the table leaf 420 is not possible. Hence, the travel can only occur when the table is in the 90 degree rotated position. Otherwise, the pin 440 hits the underside of the table 420 and prevents the cam follower 450 stepping up the step 451a on the cam track 451.

Figure 13:
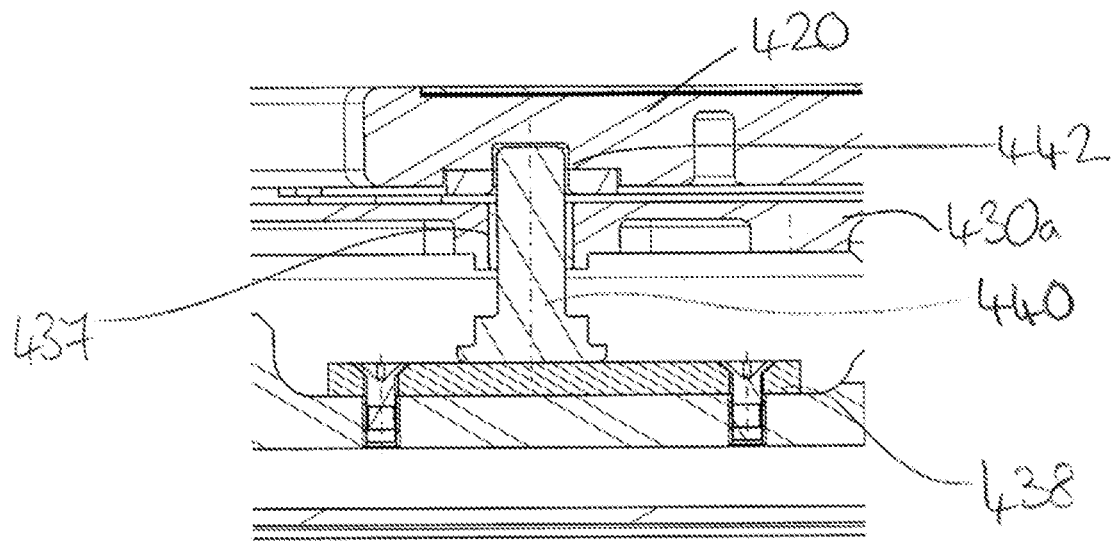
FIG. 13 shows an enlarged side view of the deployable table assembly of FIG. 6, in a "partly deployed" configuration, showing the retaining pin.

The cam follower 450 stepping up on the cam track 451 causes the retaining pin 440 to be pushed up into a second hole 442 in the table 420, as shown in FIG. 13. This hole 442 is shallower than hole 441 and thus prevents the movement of the table 420 in relation to the support arm portion 430a by preventing the cam following 450 being able to move further up the cam track 451 (up another step). This, this prevents any further stowage movement of the table 420 towards the console or mounting plate 64.

When a passenger wishes to fully stow the table, they need to pull it back towards them, away from the console, so that cam follower 450 drops down the step in the cam track 451 and the pin 440 is dropped down away from hole 442. This allows the table to be rotated back into its original (0 degrees) orientation. Then, when the table 420 is pushed back and cam follower 450 travels up the cam track 451, the cam follower 450 is not prevented from lifting up with the steps in the cam track 451. This is because pin 440 is now located in hole 441, which is deeper than hole 442.

Figure 14:
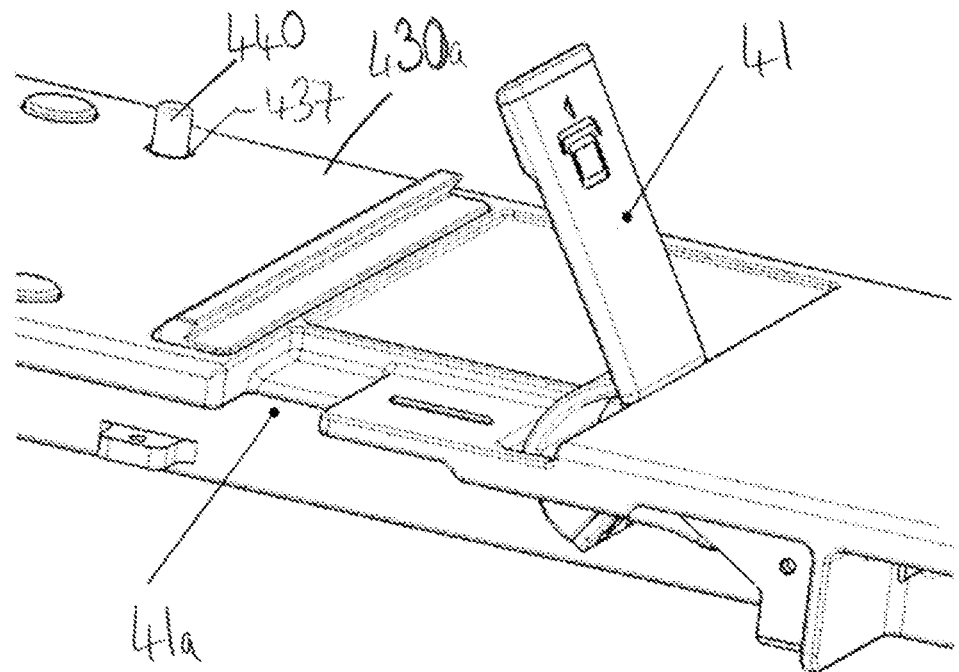
FIG. 14 shows a perspective view of the deployable table assembly in the "fully deployed" configuration, showing the pivotable arm in a 60 degree position.

FIG. 14 shows a perspective view of the deployable table assembly 410 in the "fully deployed" configuration, showing the pivotable arm in a 60 degree position. Here, the pivotable arm 41 is stopped from rotating any further by the bottom of the arm abutting the support arm portion 430a. This Figure also shows a gap 41a in the support arm portion 430 that also a passenger to easily push the pivotable arm 41 up from underneath the support arm portion 430a.

Whilst the present invention has been described and illustrated with reference to particular embodiments, it will be appreciated by those of ordinary skill in the art that the invention lends itself to many different variations not specifically illustrated herein.

For example, the width of the pivotable arm 40 can be any suitable width, depending on the type/size of personal electronic device expected to be used with it.

As another example, the tip 43 of the pivotable arm 41 and/or the retaining lips 33, 34, 35 do not have to be rubber and could be any suitable material that has a high friction surface and/or is resilient or malleable.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A deployable table assembly comprising:
a deployable table, and
a support arm,
wherein the deployable table is moveably mounted to the support arm and is moveable in relation to the support arm between a stowed position and a deployed position,
wherein the support arm comprises a coverable region that is:
  covered by the deployable table when the deployable table is in the stowed position, and
  not covered by the deployable table when the deployable table is in the deployed position,
wherein the deployable table assembly further comprises:
  a holder for a personal electronic device mounted at least partially over the coverable region of the support arm such that the holder is:
    at least partially covered by the deployable table element when the deployable table is in the stowed position, and
    at least partially exposed when the deployable table is in the deployed position,
wherein the holder comprises a pivotable arm that is rotatably mounted by a first end to the support arm and wherein a second, opposite end of the pivotable arm provides a first support surface for the electronic device,
wherein there is also provided a second support surface for the electronic device,
wherein the second support surface is provided by a selected retaining edge mounted on the support arm, and
wherein there are a plurality of retaining edges mounted on the support arm at different positions along the support arm to allow the holder, and any electronic device held by it, to take a number of different angled positions, and the selected retaining edge is selected from the plurality of retaining edges.

2. A deployable table assembly as claimed in claim 1, wherein movement of the deployable table between the stowed and deployed positions is a movement within the plane of the deployable table.

3. A deployable table assembly as claimed in claim 2, wherein the movement of the deployable table is by rotating or sliding.

4. A deployable table assembly as claimed in claim 1, wherein the deployable table may be moved towards a user when moving from the stowed position to the deployed position and wherein the coverable region of the arm, as viewed by the user, is behind the deployed position of the deployable table.

5. A deployable table assembly as claimed in claim 1, wherein the pivotable arm is rotatable between a stowed position, where the pivotable arm is substantially flush with the support arm, and at least one deployed position, where the pivotable arm projects at an angle from the support arm.

6. A deployable table assembly as claimed in claim 1, wherein the deployable table assembly comprises a table locking mechanism that prevents the table from moving towards the stowed position when the pivotable arm is not in the stowed position.

7. A deployable table assembly as claimed in claim 1, wherein the holder is translatably mounted to the support arm and translatable in relation to the support arm from a first translation position to a second translation position.

8. A deployable table assembly as claimed in claim 1, wherein the deployable table assembly is suitable for mounting to an aircraft interior structure.

9. A deployable table assembly as claimed in claim 8, wherein the deployable table assembly is suitable for mounting to the back of a passenger seat or a console unit, for use by a passenger behind.

10. A deployable table assembly comprising:
a deployable table, and
a support arm,
wherein the deployable table is moveably mounted to the support arm and is moveable in relation to the support arm between a stowed position and a deployed position,
wherein the deployable table assembly further comprises:
  a holder for a personal electronic device mounted to the support arm,
wherein the holder is translatably mounted to the support arm and translatable in relation to the support arm from a first translation position to a second translation position
wherein the holder comprises a pivotable arm that is rotatably mounted by a first end to the support arm and wherein a second, opposite end of the pivotable arm provides a first support surface for the electronic device,
wherein there is also provided a second support surface for the electronic device,
wherein the second support surface is provided by a selected retaining edge mounted on the support arm, and
wherein there are a plurality of retaining edges mounted on the support arm at different positions along the support arm to allow the holder, and any electronic device held by it, to take a number of different angled positions, and the selected retaining edge is selected from the plurality of retaining edges.

11. A deployable table assembly as claimed in claim 10, wherein the holder is slidably mounted to the support arm.

12. A deployable table assembly as claimed in claim 10, wherein the holder is slidable laterally in relation to the support arm.

13. A deployable table assembly as claimed in claim 10, wherein the pivotable arm is rotatable between a stowed position, where the pivotable arm is substantially flush with the support arm, and at least one deployed position, where the pivotable arm projects at an angle from the support arm.

14. A deployable table assembly as claimed in claim 13, wherein the deployable table assembly comprises a holder locking mechanism that prevents the holder from moving towards the second translation position when the pivotable arm is in the stowed position.

15. A deployable table assembly as claimed in claim 10, wherein the deployable table assembly comprises a table locking mechanism that prevents the table from moving towards the stowed position when the pivotable arm is not in the stowed position.

16. A deployable table assembly as claimed in claim 10, wherein the plurality of retaining edges are mounted so as to move translatably with the holder.

17. A deployable table assembly as claimed in claim 10, wherein the support arm comprises a coverable region that is covered by the deployable table when the deployable table is in the stowed position, and not covered by the deployable table when the deployable table is in the deployed position, and wherein the holder is mounted at least partially over the coverable region of the support arm such that the holder is at least partially covered by the deployable table element when the deployable table is in the stowed position, and at least partially exposed when the deployable table is in the deployed position.

* * * * *